April 7, 1964　　　　　H. M. O'NEIL　　　　　3,127,765
CONSOLIDATION AND SHEAR TEST APPARATUS
Filed Aug. 3, 1961　　　　　　　　　　　　　2 Sheets-Sheet 1
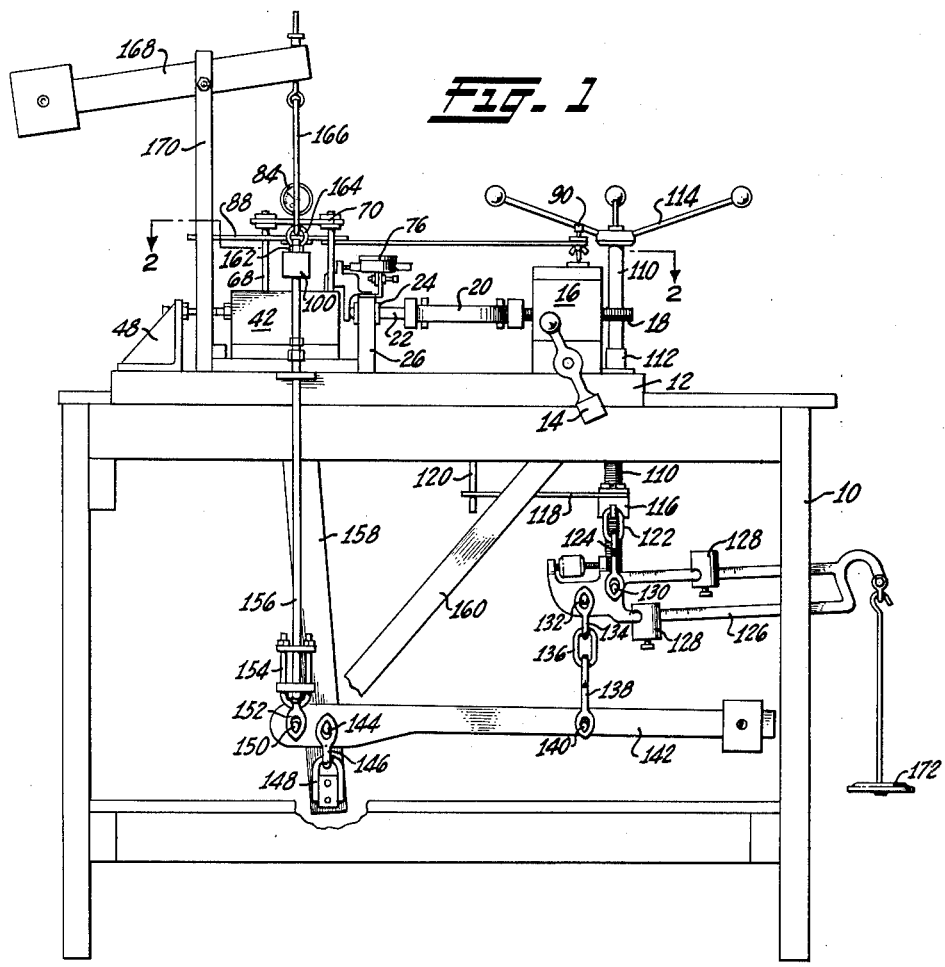
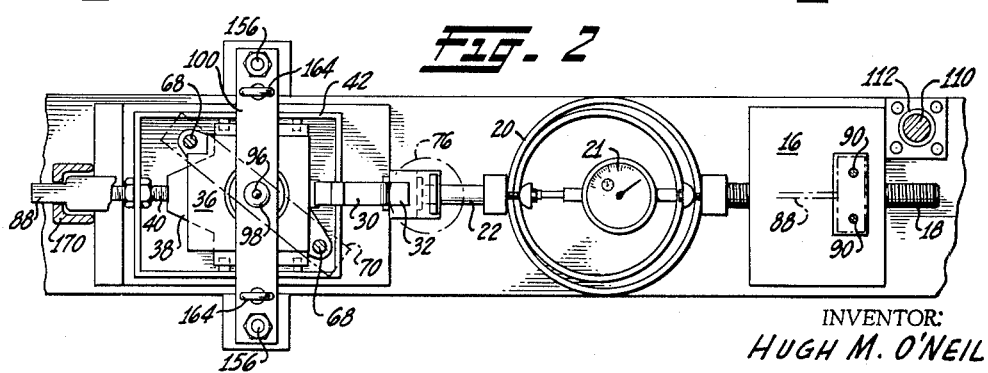
INVENTOR:
HUGH M. O'NEIL
BY
ATTORNEYS

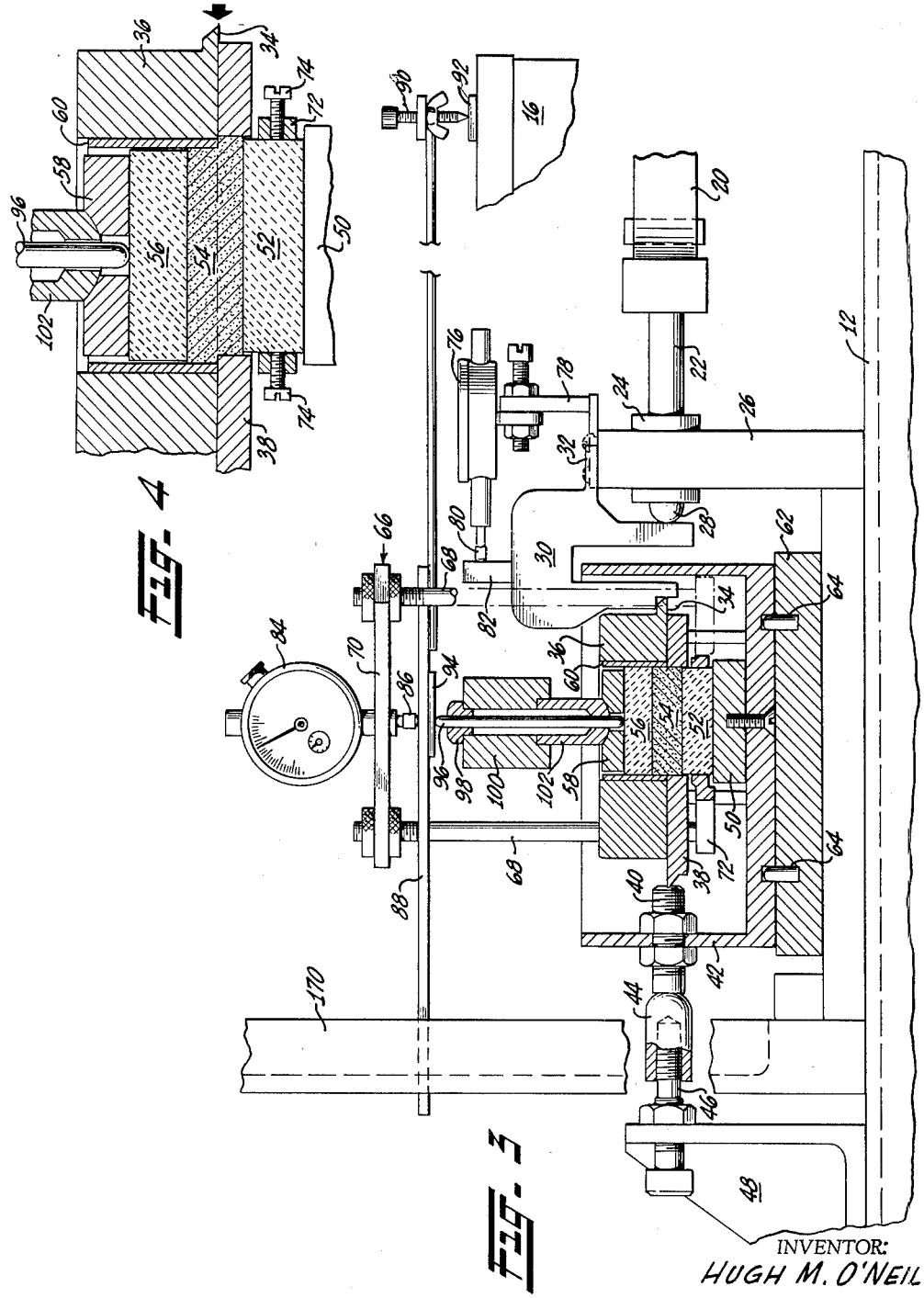

United States Patent Office

3,127,765
Patented Apr. 7, 1964

3,127,765
CONSOLIDATION AND SHEAR TEST APPARATUS
Hugh M. O'Neil, 610 16th St., Oakland 12, Calif.
Filed Aug. 3, 1961, Ser. No. 129,005
9 Claims. (Cl. 73—94)

This invention relates in general to apparatus for testing soil and more particularly to apparatus for performing consolidation tests and shear tests on soil specimens.

Two common tests run on soil and especially clay to determine behavior under stress are the consolidation test and the direct shear test. The consolidation test is a compression test performed on a laterally confined soil specimen. Porous plates or stones are placed above and below the specimen to permit free egress and ingress of water during the test. The sample is often saturated and any decrease in volume will squeeze out water; hence the necessity of the porous stones to allow water to escape during compression of a saturated soil specimen. The specimen is generally submerged during the test to prevent change of moisture content of the specimen due to evaporation. In the test, the specimen is subjected to predetermined increments of axial loads and permitted to complete primary consolidation before a subsequent increment is added. The volume change of the specimen is measured by an extensometer from which readings are taken at definite time intervals for each load increment.

Initial phases of the direct shear test are somewhat similar, the specimen being laterally confined in a box and a normal load applied through porous plates or stones above and below the specimen so as to provide for free egress and ingress of water for reasons expressed above. In the shear test, the box is split horizontally and the specimen is sheared by holding one section of the box stationary, while the other section is moved horizontally, shearing the soil specimen at about the middle. The horizontal load required to move the one section of the box is used to determine the shearing stress, while the vertical or normal load is used to calculate the normal stress. Further details of these two tests are set forth in "Laboratory Manual in Soil Mechanics" by R. F. Dawson, Pitman Publishing Corp., New York, 1949.

A variation of the standard direct shear test is that of D. W. Taylor, described in the American Society for Testing Materials Special Technical Publication No. 131 entitled "Symposium on Direct Shear Testing of Soils." Taylor has demonstrated that considerably greater accuracy is introduced by use of an apparatus which permits the volume of the soil specimen to be maintained approximately constant during shear, rather than merely providing for a constant normal load on the specimen as described in the aforementioned manual. If the volume is to be maintained constant, it is necessary that the vertical or normal load during shear be continuously variable to compensate for any increase or decrease in thickness of the specimen as reflected in readings from a vertical extensometer.

Accuracy in the measurement of specimen thickness to within a few hundred thousandths of an inch will permit determination of additional important and meaningful data not otherwise obtainable by the Taylor modification of the direct shear test. The further modification of the Taylor direct shear test will herein be referred to as the O'Neil test. If properly carried out, the greater precision in maintaining constant specimen thickness during shear permits obtaining shear strength information for clays in terms of "effective" stresses which information is in reasonable agreement with results from the far more complex triaxial tests with pore pressure measurements, and the much slower "drained" triaxial and direct shear tests.

Apparatus which has been available heretofore for the running of the aforementioned tests has tended to introduce minor errors but of sufficient magnitude to seriously affect the results of the test. Conventionally, the probe of the extensometer used to detect specimen volume changes rests on the beam used to apply loads to the specimen, and the extensometer body is mounted on the bed or frame of the device, resulting in readings which reflect not only any compression or expansion of the specimen but also of the load applying beam, supports for the porous stones, the stones themselves, and various other elements which are compressed, moved and deformed by forces and stresses developed in transmitting pressure to the specimen. Further, when the O'Neil test is employed, it is essential, as indicated, that the volume of the soil specimen be held constant with great precision throughout the test. Direct shear test machines available heretofore have not been constructed to enable shear tests to be run with great accuracy in maintaining constant specimen thickness during shear, because of hitherto unavoidable errors in measurement of specimen thickness caused by expansion and contraction of various parts of the apparatus due to changes in stress resulting from required changes in the normal load during shear.

It is therefore an object of this invention to provide modifications for the consolidation and direct shear apparatus presently available so as to permit a more accurate detection of any change in volume of the soil (especially clay) specimen under test.

It is a further object of this invention to eliminate as factors in any readings obtained from the vertical extensometers used with such apparatus any change in thickness deformation or movement of various elements of the machines, thus assuring that readings are more nearly reflections of the volume change of the specimens under test.

Another object of this invention is to hold the specimen under constant volume as the specimen, during shear, has a tendency to increase, or decrease in volume, depending on the material being sheared.

Other objects and advantages of this invention, if not specifically set forth, will become apparent during the course of the description which follows.

Generally, this invention comprises several modifications of the standard consolidation and direct shear apparatus available on the market. The major modification of both conventional types of apparatus involves the elimination of various plates, supports, and pressure-applying elements as factors in any determination of whether a test specimen has changed in volume, this being accomplished by resting the pin or probe of the vertical extensometer effectively directly upon the uppermost porous stone or plate while supporting the dial indicator itself on a mounting bracket which itself is suspended from the lowermost porous stone or plate.

In the drawings:

FIGURE 1 is a side elevation of the modified direct shear apparatus of this invention which also incorporates certain structural features which may be introduced into conventional consolidation apparatus.

FIGURE 2 is an enlarged plan view taken on the line 2—2 of FIGURE 1.

FIGURE 3 is an enlarged fragmentary view partially in section of the split shear box and associated elements of this invention.

FIGURE 4 is an enlarged fragmentary view of a portion of the split shear box of this invention indicating the action of the box when horizontal pressure is applied to shear the specimen under test.

Referring to the drawings wherein like characters refer to like parts throughout, there is shown a frame or support 10 on which is mounted bed 12. Means are provided for applying horizontal pressure, so as to provide shearing forces including a hand crank 14 operating through a gear box system 16 which drives worm gear 18. The hand crank system may be replaced by an electrically-driven prime mover and a transmission unit as in the "Soiltest" Model D-120. The proving ring 20 with its extensometer 21 is secured to one end of the worm 18 and at the other to the piston 22 which is slideably supported by bushing 24 (see FIGURE 3), in turn supported by fixed upright 26. The distal end 28 of the piston 22 bears against one downwardly-depending flange of the C-shaped member 30, in turn having horizontal flange 32 mounted for sliding movement on the top surface of upright 26. The second downwardly-depending flange of the C-shaped member 30 exerts pressure on the knife edge of the horizontal flange 34 of the upper (movable) section 36 of the horizontally split, bronze shear box. The lower section 38 of the bronze shear box is fixed against lateral movement in the direction of the upper section by a stud 40 which is bolted in place in the wall of shear box housing 42 which is filled with water when tests are run. Lateral movement of the entire shear box is prevented by contact of the female member 44 with one end of the stud 40. The female member 44 is in turn secured in place on bolt 46 mounted on the angle iron 48 which is bolted to the bed 12.

Mounted on the base of the shear box housing is the bronze plate 50 which supports lowermost porous stone 52, the specimen under test 54, the top-most porous stone 56, and the bronze plate 58 through which normal pressure is applied to the specimen. Immediately surrounding the top-most porous stone and a portion of the specimen is the removable bronze collar 60. This collar facilitates preparation of samples for consolidation or shear tests, since the core sample may be simply forced into the collar providing a proper-sized specimen for test. The shear box housing is supported on bronze base plate 62 and properly positioned relative thereto by means of pins 64.

A yoke, generally 66, consisting of a pair of upright studs 68 and horizontal strap 70 is supported by ring 72 which, as shown in FIGURE 4, is secured about the lowermost porous stone 52 by means of set screws 74. In FIGURE 4, the plate is shown rotated 45° from the orientation seen in FIGURE 3 whereby to indicate the positions of the set screws 74.

The lateral movement of C-shaped element 30 is measured by extensometer 76 which is bolted to flange 78 in turn fixed on upright 26. In accordance with customary practice, this extensometer may be graduated in 0.001 increments. The probe 80 thereof bears against upright flange 82 which is integral with the C-shaped element 30.

The vertical extensometer 84, graduated in 0.0001 in. increments which is used to measure vertical movements of stone 56 rests on the plate 70 of the yoke 66. The movable probe 86 of the extensometer rests on the upper surface of strap 88 which is pivotally-supported by means of the dual wing nut and screw assemblies 90 at one end thereof. The freely floating end of the strap is guided and permitted only vertical movement as seen in FIGURE 3. The pointed ends of the screws rest upon bearing plate 92. Polished glass plate 94 is secured beneath the strap 88 to provide an accurate plane surface and minimize friction at the point of contact of floating pin 96 during lateral movement thereof. The pin 96 passes through the axial bores through guide 98 and load applying beam 100 which in turn applies pressure to the cup-shaped element 102 which is also provided with an axial bore for receipt of pin 96. The cup-shaped pressure-applying element is convex at its lowermost end to register with the concave portion of bronze plate 58.

It will be seen that pressure due to a load applied to beam 100 is transmitted directly to the porous stone 56 and then to the soil sample, yet the extensometer is so positioned and mounted that compression of elements of the machine will be reflected in a change in the reading of extensometer 84 only to the extent that porous stone 56 is compressed and to the extent that about ½ of stone 52 is compressed, the ring 72 being mounted as close to the top of the stone as is convenient. Machines which have been used heretofore have been arranged with the upright dial supporting studs 68, mounted on the bed 12, or the shear box housing 42 and with the probe 86 of the extensometer resting on the upper surface of the load applying beam 100, with the result that each of the elements 100, 102, 58, 50, 42 and 62 contributed to any change in the extensometer reading. Separate and distinct means were not provided for applying the normal load, on the one hand, and detecting volume changes, on the other, the latter being arranged, as noted above, so as to eliminate the former as a factor in the readings taken.

The preferred embodiment of this device is particularly designed for maintaining a constant volume within the area bounded by the stones 52 and 56 and the lateral walls of the shear box after consolidation of the soil specimen is completed. This is in accordance with the O'Neil shear test procedures mentioned above. For this reason, it is not desired simply to suspend weights from the beam or pressure applying element 100 as this would make it impossible to vary slightly the pressure applied to the specimen under test during the shearing operation. For this reason, the beam scale seen in FIGURE 1 is provided. The beam assembly is supported by shaft 110 which is threaded at its lower end and is journaled in bearing 112 secured to bed 12 and is provided with handle 114. Threaded onto the lowermost end of the shaft 110 is boss 116 to which is fixed the horizontal notched strap 118 having two fingers at its distal end, only one of which is shown in FIGURE 1. These extend on either side of fixed downwardly-depending guide 120. It will be seen that as the handle 114 and shaft 110 are turned, boss 116 will not be rotated because of the co-action of strap 118 and downwardly-depending guide 120 but will move up or down. Suspended from the boss 116 is the link 122 which in turn supports U-bolt 124. The lowermost ends of the U-bolt 124 are provided with eyes and the beam 126 having sliding weights 128 thereon is supported therefrom by knife-edges 130. A second pair of knife edges 132 support the U-bolt 134, link 136 and U-bolt 138 which in turn has eyes surrounding knife edges 140 of the weighted lever arm 142. The lever arm in turn pivots on knife edges 144 in the eyes of U-bolt 146, which in turn is linked to U-bolt 148 attached to the brace 158 which is secured to the frame of the device. Spaced laterally from the knife edges 144 is the pair of knife edges 150 which cooperate with eyes 152 which are in turn secured by means of the U-bolt 154 and plate arrangement shown to the rods 156. Only a single rod is shown in FIGURE 1, but it will be understood that there is another directly behind that shown. Suitable additional bracing 160 is also provided. The rods 156 are threaded at the uppermost ends thereof and pass through holes in load applying beam 100. Nuts 162 secure the rods 156 in place in the beam 100 which also has a pair of rings 164 at either end thereof to which is secured beam-supporting handle 166. Weighted lever 168 supported by upright stanchion 170 is so proportioned relative to the beam 100 and various elements secured thereto that the lever will just support these provided no load is applied thereto by means of the balance assembly. This eliminates the weights of these elements as factors when tests are run. It will be seen that by the use of additional fixed weights 172 or by adjusting sliding weights 128 on the beam 126, weighted lever 142 is pivoted about knife edge 144 so that the left end of the beam, as seen in FIGURE 1, is forced downwardly, applying additional weight to the beam 100 and hence to the specimen 54.

The use of the sliding weights 128 or a similar variable loading device is important if the apparatus is used to conduct the O'Neil direct shear test, since, using this method, it is essential that the volume of the sample be maintained essentially constant throughout the test period. Changing loading by sliding weights 128 permits one to maintain the indicator of extensometer 84 in essentially a fixed position, even though shearing is taking place at the same time. This is not possible with the conventional hanger and weight system.

The principles outlined, particularly with respect to detection of volume changes by the use of the floating pin 96 and with respect to the manner of mounting the extensometer 84 so that change in thickness and deformations of various portions of the apparatus is not a factor in the readings taken from extensometer 84 may be applied to the so-called MIT-type controlled-strain shear machine described at page 156 of the aforementioned Dawson Laboratory Manual on Soil Mechanics. In the MIT-type machine, and other machines using ball bearings or rollers under the shear box, the uppermost portion of the shear box remains stationary and the lowermost portion is moved laterally by applying pressure thereto. This is simply the converse of the arrangement described above.

Similarly, that portion of the invention described above relating to eliminating various apparatus parts as factors in vertical dial readings may be applied also to structures designed for performing a consolidation test without shear. It is desired to detect any change in specimen volume with increasing pressure and the structure of FIGURE 3 may be used virtually as shown excepting for simplification to substitute a single element shear box. Also, the portion of the structure used to apply horizontal stress is eliminated. Finally, it is possible that the strap 88 may be removed if the apparatus is used solely for running consolidation tests without shear. However, it has been noted that in running even these tests, the tilting of the loading beam 100 to which pressure is applied may be such as to render desirable the arrangement described in detail above wherein the strap 88 permits a certain amount of lateral movement of floating pin 96 without the probe 86 of the extensometer being moved vertically.

Before shearing a soil specimen, especially fine clay, the specimen must be consolidated for a period of several hours and in the case of fine clay from 12 to 24 hours. Shearing to peak shear by the use of the structure described above requires only three or four minutes. Thus, the number of tests which may be run if the above described structure is also used for consolidation purposes may be only one or two a day.

This difficulty can be overcome by use of the floating pin and separate dial support assembly features, by consolidating several soil samples simultaneously in separate shear boxes. By means of the floating pin and dial support features, the amount of compression of the specimens may be accurately maintained during the release of load when removing the shear boxes from the separate loading device and during the reapplication of the same amount of load when the shear box is being assembled in the shear machine to prepare for the shear test. This may be done by incorporating adjustable load holding screws built into each shear box, so that swelling or contraction of the specimens can be accurately controlled and thus prevented in transferring the shear box to the shear machine. Since the entire externally applied consolidation load is removed and then re-applied in the process of making the transfer, the deformations and distortions within the shear box are great, and it is impossible to maintain reasonably accurate specimen thickness during the transfer without the use of the floating pin and dial support features.

By use of separate consolidation devices, it is possible to consolidate 20 or more specimens in separate shear boxes, thus increasing by 20-fold the capacity of a single shear machine.

Certain details of the structure have been omitted where they are conventional as, for example, the alignment pins for the two-piece shear box and details regarding means for applying horizontal stress.

Obviously, many modifications and variations may be made without departing from the spirit and scope of this invention, and therefore only such limitations should be imposed as are indicated in the appended claims.

I claim:

1. In a shear apparatus wherein a soil specimen is subjected to a compressive force while laterally confined, said compressive force being transmitted through rigid porous members positioned above and below said specimen, one of said rigid porous members being fixed and one of said rigid porous members being movable toward and away from the other, the improvements comprising:
   (a) support means secured to the fixed porous member at a point adjacent the specimen said means having at least a single, arm extending therefrom for supporting an extensometer opposite said movable rigid porous member;
   (b) an extensometer mounted on said arm and positioned opposite the said movable rigid porous member, said extensometer having a reciprocating probe extending toward the surface of said movable rigid porous member farthest removed from said specimen;
   (c) means for applying and removing a continuously variable force to the said surface of said movable rigid porous member farthest removed from said specimen, said means for applying a force being positioned beneath the reciprocating probe of the said extensometer and being free of contact therewith whereby movement of the said means for applying force will not directly affect the said extensometer and probe, said means for applying a force having a passage therethrough co-axial with said extensometer probe for receipt of a pin, said passage extending to the surface of said movable rigid porous member farthest removed from said specimen;
   (d) a pin positioned in the said passage and planar means at the top thereof for contacting and controlling movement of the said probe of the said extensometer, said pin directly contacting the surface of said movable rigid porous member farthest removed from said specimen, said pin and said probe of said extensometer being free to move horizontally relative to one another.

2. The structure of claim 1 wherein said specimen is laterally confined by means of a two-piece split shear box, one portion of said box being capable of lateral movement and the second portion thereof being fixed against lateral movement.

3. In an apparatus wherein a moist soil specimen is subjected to a compressive force while laterally confined, said compressive force being transmitted through rigid porous members positioned above and below said specimen, one of said rigid porous members being fixed and one of said rigid porous members being movable toward and away from the other, the improvements comprising:
   (a) first means for applying and removing said compressive force;
   (b) second means bearing directly on the surface farthest removed from said soil specimen of the said movable rigid porous member for detecting movement of said rigid porous member relative to the other of the said rigid porous members;
   (c) an extensometer having a reciprocating probe fixed adjacent said second means;
   (d) and a plate mounted between said second means and the said probe, each of said probe and said second means bearing on said plate but being unattached thereto, whereby vertical movement of said second means is transmitted to sid plate and thence to said probe, and each of said probe and said second means are free to move horizontally relative to said plate.

4. In a consolidation apparatus wherein a moist soil specimen is subjected to a compressive force while laterally confined, said compressive force being transmitted through rigid porous members positioned above and below said specimen, one of said rigid porous members being fixed and one of said rigid porous members being movable toward and away from the other, the improvements comprising:

(a) means mounted about the fixed rigid porous member for supporting an extensometer thereon;

(b) an extensometer mounted on said support means and positioned opposite the said movable rigid porous member, said extensometer having a reciprocating probe extending toward the said movable rigid porous member;

(c) a movable strap mounted between said extensometer and said movable rigid porous member, said probe resting on said strap whereby the said probe of the said extensometer may follow the vertical movements of the said strap;

(d) means for applying and removing a compressive force to the said movable rigid porous member, said means for applying a compressive force being positioned between said strap and said movable rigid porous member and having a pasage through said means for receipt of a pin;

(e) and a pin positioned in the said passage and contacting said strap, said pin providing direct communication between the surface of said movable rigid porous member and the said strap, said pin and said probe of said extensometer each being free to move horizontally relative to said strap.

5. The structure of claim 4 wherein said specimen is laterally confined by means of a two-piece split shear box, one portion of said box being capable of lateral movement and the second portion thereof being fixed against lateral movement.

6. The structure of claim 4 wherein said specimen is laterally confined by means of a two-piece split shear box having lower and upper sections, the upper section being capable of lateral movement and said lower section being fixed.

7. The structure of claim 4 wherein said specimen is laterally confined by means of a two-piece split shear box having lower and upper sections, the lower section being capable of lateral movement and said upper section being fixed.

8. In a shear apparatus wherein a moist soil specimen is subjected to a compressive force while laterally confined, said compressive force being transmitted through rigid porous members positioned above and below said specimen, one of said rigid porous members being fixed and one of said rigid porous members being movable toward and away from the other and wherein there is provided means for applying a compressive force to the said movable rigid porous member, the improvements comprising:

(a) first means for continuously varying the said compressive force whereby the volume of the specimen may be kept essentially constant at all times irrespective of the pressure exerted by the said specimen on the said rigid porous members;

(b) second means bearing directly on the surface farthest removed from said soil specimen of the said movable rigid porous member for detecting movement of said rigid porous member relative to the other of the said rigid porous members, said second means being free to move with respect to said first means;

(c) an extensometer having a reciprocating probe fixed adjacent said second means;

(d) and a plate mounted between said second means and said probe, each of said probe and said second means bearing on said plate but being unattached thereto, whereby vertical movement of said second means is transmitted to said plate and thence to said probe, and each of the said probe and said second means are free to move horizontally relative to said plate.

9. In a shear apparatus wherein the soil specimen is subjected to a compressive force while laterally confined, said compressive force being transmitted through rigid porous members positioned above and below said specimen, one of said rigid porous members being fixed and one of said rigid porous members being movable toward and away from the other and wherein there is provided means for applying a compressive force to the said movable rigid porous member, the improvements comprising:

(a) means for applying a continuously varying compressive force whereby the volume of the specimen may be kept essentially constant at all times irrespective of the pressure exerted by the said specimen on the said rigid porous members;

(b) an extensometer secured to a support member mounted on the said fixed porous member, said extensometer having a freely moving reciprocating probe extending toward the said movable rigid porous member;

(c) a movable strap mounted between said extensometer and said movable rigid porous member, said probe resting on said strap whereby the said probe of the said extensometer may follow the vertical movements of the said strap and be free to move horizontally relative thereto;

(d) means for applying to and removing from said movable rigid porous member a compressive force, said means for applying a compressive force being positioned between said strap and said movable rigid porous member and having a passage through said means for receipt of a pin;

(e) and a pin positioned in the said passage and contacting said strap, said pin providing direct communication between the said surface of said movable rigid porous member and the said strap but being unattached thereto whereby said pin is free to move horizontally relative to said strap and said extensometer.

References Cited in the file of this patent

UNITED STATES PATENTS

| 2,533,279 | Moore et al. | Dec. 12, 1950 |
| 2,691,886 | Cole | Oct. 19, 1954 |
| 3,035,437 | Watkins | May 22, 1962 |

FOREIGN PATENTS

| 1,026,839 | France | Feb. 11, 1953 |